Sept. 6, 1927.  E. E. BILGART ET AL  1,641,837
BATTERY CONNECTER
Filed March 7, 1923
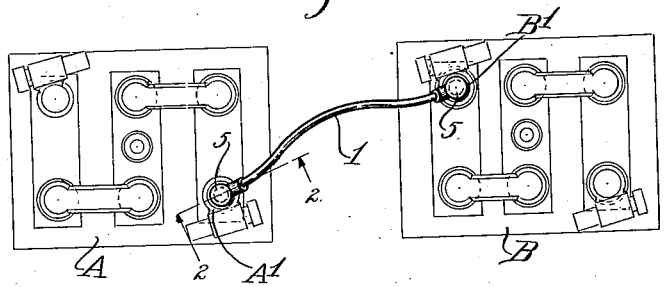
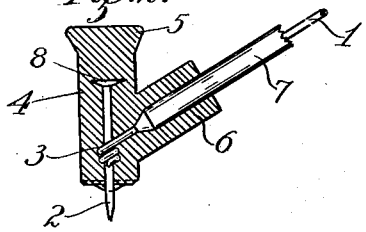 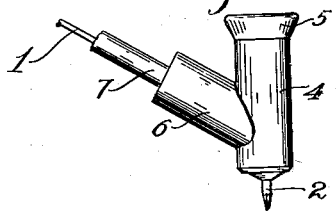
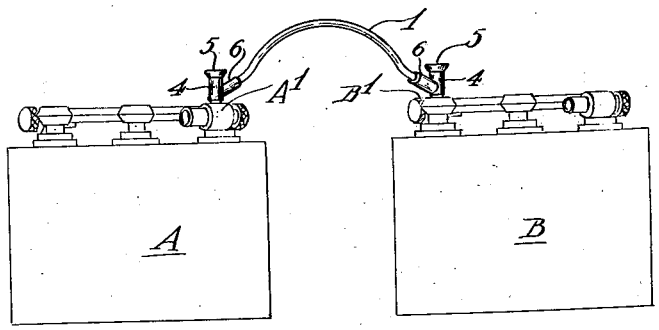
INVENTORS.
Eric E. Bilgart.
& Frederick P. Bartlett.
By Burton & Burton
their ATTORNEYS.
Witness
N. T. McKnight.

Patented Sept. 6, 1927.

1,641,837

UNITED STATES PATENT OFFICE.

ERIC E. BILGART AND FREDERICK P. BARTLETT, OF CHICAGO, ILLINOIS.

BATTERY CONNECTER.

Application filed March 7, 1923. Serial No. 623,330.

The purpose of this invention is to provide an electrical conductor adapted to serve as a connecter or "jumper" for storage batteries and constructed with special terminals which are both economical to produce and simple to apply or remove from a battery terminal. It consists of certain features and elements in combination as shown and described, and as indicated by the claims.

In the drawings:—

Figure 1 is a top plan view showing two storage batteries connected by a device embodying this invention.

Figure 2 is a detail section taken as indicated at line, 2—2, on Figure 1 to show the interior structure of the terminal and its body.

Figure 3 is a side elevation of the terminal body.

Figure 4 is a side elevation of the batteries shown in Figure 1.

Storage batteries made up of a small number of cells to each battery are frequently joined in series, especially for the operation of re-charging them, and to provide an efficient connecter which can be applied or removed with the least loss of time. We have found it desirable to supply the conductor wire with sharpened terminals which can be readily driven into the soft lead terminals of the battery and easily withdrawn therefrom. Such a connecter is shown in Figure 1 used as a "jumper" between two 3-cell batteries, A and B, respectively.

As shown in the drawings, the conductor wire, 1, is provided with sharpened metallic terminal members, 2, the bared end of the wire being wrapped around such terminal as shown at 3 in Figure 2. The wrapped portion of the terminal is then embedded in a body, 4, by molding or casting such body around the terminal, 2. We have found a cast lead body entirely satisfactory for this purpose. The sharpened end of the terminal, 2, protrudes from one end of the body, 4, while the other end is preferably formed with a flaring head, 5, to receive the force or push of driving means for entering the sharpened end, 2, in the battery terminal such as $A^1$ or $B^1$, of the batteries shown in Figure 1.

To firmly support the connecter we form the body, 4, with a branching portion, 6, which extends obliquely upward from the end of the body from which the sharpened end of the terminal, 2, protrudes, and if the conductor wire, 1, has an insulating covering, 7, this covering may extend into the molded branch, 6, of the body, 4, as indicated in Figure 2. To anchor the terminal, 2, in the body, 4, by something more than its mere contact or frictional engagement with the molded material, we may solder the wrapped connection at 3 so that this will constitute an enlargement, and we may also provide the terminal with an integral enlargement such as the head, 8, through which the driving impact exerted upon the head, 5, will be transmitted to the sharpened end of the terminal, 2. In fact, a small wire nail makes a very satisfactory terminal member, 2, and thus provides the head, 8, for such engagement with the cast body, 4.

It may be understood that each connecter or jumper wire, 1, will be made up with a terminal, 2, attached to each of its ends and with a molded body, 4, surrounding the connection.

We claim:—

1. In a battery connecter, a conductor wire, a sharpened metallic terminal about which one end of said wire is wrapped and a body portion molded around the part of the terminal upon which the wire is wrapped with the sharpened end of said terminal protruding from such body.

2. The combination with an electrical conductor of a solid terminal comprising a metallic body formed to provide an anvil head adapted to be pounded, said head having a penetrating point adapted to be driven into the terminal of a storage cell, and a laterally projecting arm integral with said head, in which the electrical conductor is secured.

In testimony whereof, we have hereunto affixed our hands at Chicago, Illinois, this 5th day of March, 1923.

ERIC E. BILGART.
FREDERICK P. BARTLETT.